United States Patent
Kampke (10) Patent No.: US 8,951,455 B2
(45) Date of Patent: Feb. 10, 2015

(54) METHOD FOR REINFORCING A HOLE EDGE REGION WORKPIECE WITH A HOLE WITH REINFORCED HOLE EDGE REGION HOLE EDGE REINFORCING DEVICE

(75) Inventor: Manfred Kampke, Eitensheim (DE)

(73) Assignee: Röchling Automotive SE & Co. KG, Mannheim (DE)

( * ) Notice: Subject to any disclaimer, the term of this patent is extended or adjusted under 35 U.S.C. 154(b) by 268 days.

(21) Appl. No.: 13/403,230

(22) Filed: Feb. 23, 2012

(65) Prior Publication Data

US 2012/0219754 A1 Aug. 30, 2012

(30) Foreign Application Priority Data

Feb. 23, 2011 (EP) .................................. 11155703

(51) Int. Cl.
| | | |
|---|---|---|
| *B29C 70/46* | (2006.01) | |
| *B26F 1/14* | (2006.01) | |
| *B29C 70/54* | (2006.01) | |
| *B32B 3/24* | (2006.01) | |
| *B26D 7/00* | (2006.01) | |
| *B26F 1/02* | (2006.01) | |
| *B26F 1/24* | (2006.01) | |
| *B26F 1/44* | (2006.01) | |

(52) U.S. Cl.
CPC ....... *B29C 70/545* (2013.01); *B29C 2793/0045* (2013.01); *B29C 2793/0081* (2013.01); *B29C 2793/009* (2013.01); *B26D 2007/0093* (2013.01); *B26F 1/02* (2013.01); *B26F 1/14* (2013.01); *B26F 1/24* (2013.01); *B26F 2001/4427* (2013.01); *B29C 70/46* (2013.01)
USPC ............ 264/155; 264/163; 264/319; 264/322

(58) Field of Classification Search
USPC .................................. 264/155, 163, 319, 322
See application file for complete search history.

(56) References Cited

U.S. PATENT DOCUMENTS

| | | | | | |
|---|---|---|---|---|---|
| 3,517,410 | A | * | 6/1970 | Rapisarda ....................... | 425/196 |
| 4,248,820 | A | * | 2/1981 | Haataja .......................... | 264/113 |
| 4,886,632 | A | * | 12/1989 | Van Iten et al. ............... | 264/156 |
| 5,188,625 | A | | 2/1993 | Van Iten | |
| 6,830,797 | B2 | * | 12/2004 | Haataja .......................... | 428/106 |
| 6,837,956 | B2 | * | 1/2005 | Cowell et al. .................. | 156/252 |
| 2007/0227217 | A1 | | 10/2007 | Halamoda | |

FOREIGN PATENT DOCUMENTS

| | | |
|---|---|---|
| DE | 20 27 373 A1 | 12/1971 |
| DE | 37 15 409 A1 | 12/1987 |

OTHER PUBLICATIONS

Presentation at CCeV Automotive Forum in Neckarsulm on 24.06. 2010 W. Hufenbach and F. Adam, both from the Institute of Lightweight Structures and Polymer Technology at TU Dresden (22 pages).

* cited by examiner

*Primary Examiner* — Atul P. Khare
(74) *Attorney, Agent, or Firm* — Rothwell, Figg, Ernst & Manbeck, P.C.

(57) ABSTRACT

The invention relates to a method for reinforcing a predetermined edge region of a hole in a hole region of a workpiece, the edge region comprising an edge of the hole, the hole region comprising thermoplastically bound fibers, preferably a thermoplastically bund fiber tangle, comprising the steps: providing the workpiece with a softened thermoplastic binder at least in the hole region, penetrating the hole region of the workpiece in a penetration direction with displacement of fibers with a spike, after penetration: scraping fibers from the spike contrary to the penetration direction by a scraper part mobile relative to the spike, and compacting the predetermined edge region surrounding the spike with a pressing surface of the scraper part relative to workpiece regions of the hole region located radially outside the edge region.

10 Claims, 4 Drawing Sheets

METHOD FOR REINFORCING A HOLE EDGE REGION WORKPIECE WITH A HOLE WITH REINFORCED HOLE EDGE REGION HOLE EDGE REINFORCING DEVICE

The invention relates to a method for reinforcing a predetermined edge region of a hole (hole edge reinforcing method) in a hole region of a workpiece, which comprises thermoplastically bound fibres, preferably a thermoplastically bound fibre tangle, the fibre material of the hole region exhibiting a degree of compaction radially outside the predetermined edge region in the finished state of less than 90%, preferably of less than 80%.

The invention further relates to a workpiece with a hole with reinforced hole edge region and a hole edge reinforcing device.

A hole forming device and a hole forming method are known from DE 37 15 409 A. In the known device plastics mats, which are reinforced by laid fibre or woven fibre fabric, are bundled and arranged between two metal bars enclosing the mat bundle. From one of the metal bars pointed spikes project in the bundling direction towards the other metal bar designated a "steadying bar", which pointed spikes are intended to penetrate the mats of fibre-reinforced plastics. Through-holes are provided for the spikes in the steadying bar, which also comprises a workpiece bearing surface as per the present application.

The resultant bundle is brought to between the punch and bed of a pressing device, whereupon the punch exerts sufficient pressure on the metal bar bearing the spikes for the spikes to be driven through the mat bundle and through the through-holes in the steadying bar into corresponding recesses in the press bed.

In the process, at their passage sites the spikes displace the fibres of the laid or woven fibre fabric in the individual mats. Since the thermoset-bound fibre composite material described in DE 37 15 409 A exhibits a degree of compaction of 100%, i.e. is compact, when fibres are displaced out of the perforated region, local compaction of fibres occurs around the hole, but no compaction of the material per se in the sense of a reduction in porosity, which is in any event not present in the case of the material of DE 37 15 409 A.

In this compressed state with the spikes passing through the mats, the mat bundle is cured in the press for a period of several hours, after which the spikes are removed again.

A further, similar hole forming device, however without any discernible scraper part, is known in the prior art (presentation at CCeV Automotive Forum in Neckarsulm on Jun. 24, 2010 by W. Hufenbach and F. Adam, both from the Institute of Lightweight Structures and Polymer Technology at TU Dresden) for use in a thermoplastic matrix with woven textile fabrics made from substantially continuous fibres. Such a device also makes it possible to form a hole by displacing fibres in the portion of the workpiece to be perforated.

While the above-stated prior art relates solely to compact materials, i.e. materials with a degree of compaction of 100%, the present invention relates in principle to methods which are performed on a material with a degree of compaction of less than 90%, preferably of less than 80%. The present invention also relates to workpieces of a material which comprises a degree of compaction of less than 90%, preferably of less than 80%, at least radially outside the above-mentioned predetermined edge region around a hole formed in the material.

In the present application "degree of compaction" is used as a measure of the air volume or general gas volume present in the material, such that for example a material with a degree of compaction of 100% does not include any entrapped air, i.e. is compact or non-porous, while a material with for example 60 vol. % gas content has a degree of compaction of 40%.

With the thermoplastically bound porous fibre composite materials discussed herein there is a fundamental problem when it comes to providing holes therein of sufficient tear-out strength for workpieces of such materials to constitute supports for separately configured fastening means which need to be mounted in a hole in the workpiece.

The tear-out strength of a hole edge is in principle the greater, the larger the bearing stress area and the greater the strength of the material forming the hole edge. The effective bearing stress area is proportional to the product of half the circumference of the hole and the material thickness of the hole edge. In a material which has a degree of compaction of less than 100% (porous material), the problem arises that any attempt to increase the tear-out strength of a hole edge formed in the material by increasing the strength of the hole edge material, in particular by compacting it, is associated with a reduction in the material thickness of the hole edge region. Such a reduction reduces the bearing stress area, however, which in turn reduces tear-out strength. The same applies conversely: any attempt to increase the tear-out strength of a hole edge formed of a porous material by enlarging the bearing stress area by increasing material thickness is associated with a decrease in material strength as a result of the increasing material thickness, such that the increase in bearing stress area is overcompensated by a reduction in material strength, just as in the former attempt the increase in material strength by compaction is overcompensated by a reduction in the bearing stress area.

This problem arises substantially in that workpieces of thermoplastically bound fibre composite material are conventionally made from a lofted mat material with a very low degree of compaction. Producing the workpieces using forming methods generally means there is no possibility of reinforcing hole edges by adding material, but rather the desired tear-out strength has to be achieved with the material present as raw material in the material mat.

It is therefore an object of the present invention to provide technical teaching which makes it possible to improve the tear-out strength of a hole exhibiting any desired dimensions in a porous thermoplastically bound fibre material by suitable, in particular purposeful, adjustment of material thickness in the hole edge region on the one hand and of material strength in the hole edge region on the other hand.

The object is achieved according to the invention in a first aspect by a method of the above-mentioned type for reinforcing a predetermined edge region of a hole, which method comprises the following steps:

providing the workpiece with a softened thermoplastic binder at least in the hole region, penetrating the hole region of the workpiece in a penetration direction with displacement of fibres with a spike, which comprises a body portion with a cross-sectional area which is substantially constant in the penetration direction and a longitudinal end portion tapering therefrom in the penetration direction, after penetrating the hole region with the spike: scraping fibres from the spike contrary to the penetration direction by a scraper part mobile relative to the spike, compacting the predetermined edge region immediately surrounding the spike with a pressing surface of the scraper part relative to workpiece regions of the hole region located radially outside the edge region, in such a way that the thermoplastically bound fibre material of the finished workpiece has a higher degree of compaction in the predetermined edge region than in regions of the hole region located radially outside the predetermined edge region.

Using the method according to the invention, material and in particular fibres from the region of a hole to be formed in a workpiece is displaced radially outwards into an edge region of the hole. This increases the quantity of fibre in the edge region. The edge region of the hole is then compacted such that the fibre material of the finished workpiece exhibits a higher degree of compaction in the edge region than in regions of the hole region located radially outside the edge region. In this way, the tear-out strength of the edge of the hole formed is inexpensively increased, for a substantially unchanged bearing stress area, by compacting material displaced out of the region of the hole and without the use of additional material. The scraped-off fibres strengthen the material of the edge region surrounding the hole formed, such that additional reinforcement of the hole edge to increase its dimensional stability under load is not necessary. Moreover, substantially no material wastage occurs.

It may be advantageous to use a scraper part used to scrape fibres off the spike to compact the fibre material displaced to form the hole in the edge region of the hole.

On penetration of the hole region with the above-described spike, fibres are conventionally carried with the spike in the penetration direction, such that an annular area against the spike outer wall against which lie fibres of the penetrated material is of a greater axial length than the rest of the workpiece material thickness in the penetration direction.

Since these fibres carried along by the spike have in any event to be returned, it may be convenient to provide a scraper part used for this purpose with a pressing surface directed away from the penetration direction and to use the scraper part for compaction of the edge region surrounding the spike.

The method is preferably performed using a hole edge reinforcing device according to the invention, explained below.

For the purposes of this patent application, the holes or openings to be formed are through-holes. They may in principle have any desired cross-sectional shape in a plane orthogonal to the penetration direction. However, shapes of symmetrical cross section, in particular holes shapes of round or elongate hole cross section are preferred.

The movement or mobility of a first element, mentioned in the present application, relative to a second element does not exclude the possibility for the entire patent application of one of the first and second elements being unmoved or immobile relative to a stationary frame. If for example the first element is unmoved with regard to a stationary frame, for instance a device frame, and the second element is moved or mobile with regard to the stationary frame, the first element is moved or mobile relative to the second element.

The invention is applied to porous materials which comprise fibres at least in a portion to be perforated (fibre materials). Fibre materials may comprise regular fibre structures, for example woven fibre fabric, or irregular fibre structures, in particular in the form of a fibre tangle, for instance a fibrous web or felt. In principle, any desired fibre structures are feasible. The fibres used may be of substantially any desired length in relation to the workpiece dimensions, in particular to the hole dimensions. The present invention is particularly relevant for materials with fibres which are short in relation to the hole dimensions, in particular tangled. The possibility should not however be ruled out of a workpiece according to the invention comprising portions in which the thermoplastically bound fibre material is 100% compacted. This then applies only to individual local regions, however, to which even the above-stated edge region may nonetheless belong.

The invention is additionally applicable to materials which comprise organic or inorganic fibres or indeed a mixture of organic and inorganic fibres. Examples of possible inorganic fibres are fibres of glass, carbon or ceramics, while organic fibres may for example be formed from thermoplastic polymers. According to a particularly preferred embodiment, fibres are glass fibres.

The invention is applicable in particular to workpieces of LWRT (Light-Weight Reinforced Thermoplastic) material. In this case, the initial state comprises fibre composites of comparatively low basis weight, which comprise binding fibres, for instance thermoplastic fibres, consisting for example of a polyester or a polyolefin, and reinforcing fibres, in particular glass fibres, in the form of a fibre tangle. The reinforcing fibres have a higher melting point than the binding fibres. When producing mouldings of LWRT, the fibre composite starting material is heated to a temperature between the melting temperatures of binding and reinforcing fibres and deformed under pressure into the desired shape. The fibre composite material, in which the material of the binding fibres now forms a polymer matrix, retains its shape after cooling. Due to their low mass densities and their advantageous acoustic and thermal insulation properties, LWRT materials, such as SeeberLite® and SeeberLite 2, are used primarily in vehicle construction, for example to produce underbody trim and interior door trim.

According to one advantageous embodiment of the method according to the invention, the earliest point at which the step of scraping fibres from the spike begins is when the spike has penetrated the hole region to such an extent that fibres of the workpiece lie substantially only against the body portion of the spike. This ensures that substantially no fibres lie against the tapering portion of the spike, it being the case that relative motion of scraper part and spike, in particular in the case of accommodation of at least the tapering portion of the spike in the scraper part, could otherwise lead to soiling and in particular to damage of the scraper part by the fibres. In a preferred embodiment of the invention, the fibres comprise glass fibres, which are of a greater hardness than steel and therefore abrasively damage and ultimately make unusable a scraper part made of a steel or a material of comparable or lower hardness.

Preferably, the scraping movement of the scraper part begins only after the relative motion between spike and workpiece for the purpose of penetration of the hole region has terminated. This ensures that the scraper part is not moved too far or too early relative to the spike, such that even at the start of the scraping movement the hole through which the spike passes has the desired diameter and even at the start of the scraping movement substantially no fibres lie against the tapering portion of the spike which may particularly easily enter a gap formed between spike and scraper part.

According to one advantageous embodiment of the invention, the method according to the invention comprises a further step of selecting the scraper part with regard to the size of its pressing surface as a function of the fibre composite of the hole region, the size of the hole to be formed and the desired reinforcement of the edge region of the hole to be formed. This makes it possible for a user of the method to adjust the tear-out strength to be achieved of a hole as a function of properties of the workpiece material, of the hole and of the desired reinforcement of the hole edge region.

It is advantageous if the force exerted on the scraper part during compaction of the edge region is greater than the force exerted on the spike on penetration of the hole region. This feature ensures that substantially all the fibre material introduced into the edge region of the hole may be sufficiently compacted and the edge region may be provided with the desired strength. This is because when, as is preferred, the scraping step is performed only after the end of the penetration step, the workpiece may be colder on scraping and the thermoplastic binder thus more firmly set than during penetration.

Preferably, the method of hole edge reinforcement is performed during press-forming of the entire workpiece. Such an integrated hole reinforcing and pressing method on the one hand saves the user the time and materials required for successive operations. On the other hand, the method according to the invention requires the workpiece to be provided in a condition in which the thermoplastic binder has been softened, such that the hole region may be penetrated without difficulty. It is ensured, above all during forming and in particular at the start of forming, that the workpiece is provided with a softened, as yet uncooled thermoplastic binder. For this reason, the method is still more preferably carried out at the start of press-forming.

The method according to the invention includes displacement of fibres from the hole region. This does not however rule out severing, in particular cutting, of fibres from the hole region. This may be necessary with fibre materials which are difficult to penetrate, for instance polyester nonwovens. According to a further embodiment, the step of penetration of the hole region with the spike therefore includes the severing of fibres in the hole region.

The edge region of the hole region generally preferably comprises substantially the same fibre length distribution as a region located outside the edge region. If the step of penetration of the hole region includes the severing of fibres in the hole region, the edge region of the hole region additionally comprises shorter fibres.

To achieve the desired hole edge reinforcement, compaction of the edge region may proceed in such a way that the material thickness of the finished edge region is equal to, less than or greater than the material thickness of the material region located radially outside the edge region.

For rapid hardening of the hole edge to be reinforced, it is advantageous for the spike to exhibit a lower temperature than the portion to be perforated. For the same reason, the scraper part preferably also exhibits a lower temperature than the portion to be perforated. Since fibre tangles are often placed in press moulds with molten binder material, the difference in temperature between workpiece and spike and/or scraper part may amount to several tens of kelvin.

According to a second aspect, the object is also achieved according to the invention by a workpiece which comprises at least one hole region comprising a fibre tangle, in which region a hole is formed by displacement of the fibre tangle, preferably using a method according to any one of the preceding claims, the hole region comprising, from radially inside to radially outside, the hole, a predetermined edge region surrounding the hole and containing the hole edge and a material region located outside the edge region, the edge region having a higher average degree of compaction than the material region. Such a workpiece achieves all the advantages of the teaching according to the invention mentioned in conjunction with other aspects of the invention. In particular, it provides a hole with improved tear-out strength. Preferably, the workpiece is produced by the method according to the invention for reinforcing a hole edge region and/or using a hole edge reinforcing device according to the invention and explained below.

The material region may have a degree of compaction in the workpiece according to the invention of less than 90%, preferably of less than 80%. The degree of compaction of the material region corresponds substantially to the degree of compaction of an unperforated but otherwise identical comparison workpiece. This ensures that reinforcement of the edge region of the hole is achieved by compaction of a spatially defined region of the workpiece. The material region does not on the other hand have to be machined, such that its material properties, for instance also aesthetic properties, are retained and the machining effort for the workpiece is reduced.

As has already been described with regard to the method according to the invention, the edge region of the hole region preferably comprises substantially the same fibre length distribution as the material region. This does not however rule out the workpiece according to the invention having, in other embodiments, a hole region edge region whose fibre length distribution differs from the fibre length distribution of the material region and in particular, for instance if penetration of the hole region includes separation of fibres of the hole region, is distinguished by a lower average fibre length than the fibre length distribution of the material region.

According to a further embodiment of the workpiece according to the invention, the fibre composite material of the workpiece comprises a plurality of different material plies, of which at least one comprises a thermoplastically bound fibre tangle. The workpiece may be of multi-ply construction in the penetration direction at least in the portion to be perforated, but preferably throughout. This makes it possible to provide a workpiece with a desired combination of physical, chemical and other properties through suitable combination of plies. The plies are preferably constructed with different fibre tangles which differ in terms of the materials used and/or the fibre dimensions and/or the fibre geometry and/or the degree of fibre entanglement.

In a further development of this embodiment, the fibre composite material of the workpiece comprises at least one ply with a thermoplastically bound fibre tangle and additionally a top ply of a nonwoven. Nonwovens are used on the materials discussed herein for example as a mechanical protective layer, for instance as an impact-damping layer against stone impact and the like.

According to a further embodiment of the workpiece according to the invention, the radial extent of the edge region starting from the middle of the hole in a predetermined radial direction amounts to no less than 1.5 times, preferably no less than twice, and no more than 15 times, preferably no more than 13.5 times, the hole radius in this direction.

The fibre material displaced from a hole, as has already been described above, is introduced and pressed into the edge region of the hole. The greater the ratio of the area of the edge region to the area of the hole, the less fibre material is introduced into the edge region per unit area and the less reinforcement takes place. On the other hand, the smaller the ratio of the area of the edge region to the area of the hole, the smaller is the relative area of the edge region and the greater is the reinforcing effect. Lower or upper limits for the ratio of the radial extent of the edge region to hole radius is therefore advantageous. A meaningful lower limit of the ratio of the radial dimensions of hole and edge region is the achievement of a edge region with a degree of compaction of 100%. Any compaction extending beyond this would lead merely to the expulsion of binder, but not to a further increase in material strength. The upper limit is likewise associated with a desired minimum increase in the degree of compaction of the edge region relative to the material region, for instance a desired minimum degree of compaction difference of 5%.

Finally, according to a third aspect the object is also achieved according to the invention by a hole edge reinforcing device for reinforcing a predetermined edge region of a hole comprising a hole edge in a hole region of a workpiece which comprises thermoplastically bound fibres, preferably a thermoplastically bound fibre tangle, the fibre material of the hole region comprising a degree of compaction of less than 90%, preferably of less than 80% in the finished state radially outside the predetermined edge region, the hole edge reinforcing device comprising a workpiece bearing surface for a portion to be perforated to bear against and further comprises a spike which is mobile relative to the workpiece bearing surface and is constructed to penetrate the portion to be perforated with displacement of fibres of the workpiece in a penetration direction forming an angle, preferably a right angle, with the workpiece bearing surface. The hole edge reinforcing device further comprises a scraper part, spike and scraper part being mobile relative to one another between a starting position and a final position, spike and scraper part being located in the starting position on different sides of the workpiece bearing surface and arranged at a distance from one another in the penetration direction. The scraper part then surrounds at least a longitudinal portion of the spike in the final position, which portion is located on the same side of the workpiece bearing surface as the scraper part. The scraper part is mobile relative to the workpiece bearing surface, preferably contrary to the penetration direction, and is designed to scrape fibres from the spike contrary to the penetration direction in the event of relative motion of spike and scraper part.

Such a device achieves all the advantages of the invention stated in connection with other aspects of the invention. In particular, it enables an increase in the tear-out strength of edges of holes formed in workpieces comprising thermoplastically bound fibres in a simple and inexpensive manner.

Preferably, the scraper part comprises an internal recess which is designed to accommodate the longitudinal portion of the spike in the final position. Such an internal recess makes it possible to scrape off the spike fibres lying against the spike through penetration of at least part of the spike. The scraper part particularly preferably takes the form of a sleeve.

The hole edge reinforcing device is preferably provided with a plurality of spikes, detachable if desired and if desired with varying dimensions, and/or with a plurality of scraper parts, detachable if desired and with differently dimensioned internal recesses and pressing surfaces.

The tear-out strength of a hole depends inter alia on the bearing stress area of the hole, which is proportional to the product of half the hole circumference and hole depth or material thickness in the region of the hole, and of the degree of compaction of the material in the hole edge region. Since the degree of compaction of the fibre material in the edge region of the finished workpiece is as dependent on the diameters of hole, scraper part and optionally internal recess in the scraper part as on properties, in particular of the material density before pressing and the fibre material in the region of the hole and in the edge region, according to one advantageous embodiment of the hole edge reinforcing device according to the invention the scraper part may be selected with regard to shape and size of its pressing surface and optionally its internal recess from a plurality of scraper parts, in accordance with the desired tear-out strength of the hole edge region to be formed. The device according to the invention and the method according to the invention make it possible, in particular in the case of workpieces with a relatively small degree of compaction, to increase the degree of compaction in the hole edge region to such a degree by introducing and pressing fibre material displaced from a hole into or in the hole edge region that an improved tear-out strength for the material used and the selected hole dimensions is achieved.

In this connection it has proven advantageous, as already discussed above, for the pressing surface and internal recess of the scraper part, which correspond to the edge region or the region of the hole, to exhibit dimensions such that the radial extent of the edge region, starting from the middle of the hole in a predetermined radial direction amounts to no less than 1.5 times, preferably no less than twice, and no more than 15 times, preferably no more than 13.5 times, the hole radius in this direction. In the case of scraper parts comprising an internal recess it is particularly advantageous for the radial extent of the pressing surface of the scraper part in a predetermined radial direction starting from the middle of the internal recess to amount to no less than 1.5 times, preferably no less than twice, and no more than 15 times, preferably no more than 13.5 times, the radius of the internal recess in this direction.

In addition, the hole edge reinforcing device may comprise a processing tool with two processing tool halves, the spike being arranged in a first processing tool half, preferably mobile relative thereto, and the scraper part being arranged in the second processing tool half, preferably mobile relative thereto. In particular, the processing tool may be a press mould with two press mould halves defining a press gap between them. Such an integrated hole reinforcing and pressing device allows the user to reduce the time and material used by successive operations.

The processing tool is advantageously a press mould with two press mould halves defining a press gap between them for forming shaping. A spike-side surface portion of the scraper part is advantageously further designed as a pressing surface for press-working the workpiece. A hole edge reinforcing device further developed in this way makes it possible, for example, to produce a hole in a workpiece comprising a fibre material with thermoplastic binder in the molten state which has the above-stated effects and advantages and at the same time to press the workpiece with forming effect, in particular with the edge region immediately surrounding the hole. At least one press mould half may if desired comprise a plurality of press mould half portions.

The spike is preferably mobile relative to the first processing tool half, so that it may be withdrawn behind a processing surface of the processing tool half to charge and/or close the processing tool and advanced beyond it to form a hole. Additionally or alternatively, the scraper part may be mobile relative to the second processing tool half. The workpiece bearing surface is preferably additionally a pressing surface of the first press mould half accommodating the spike, since a recess accommodating the spike conventionally comprises a smaller orifice than a recess accommodating the scraper part accommodating a spike portion, such that the pressing surface of the press mould half accommodating the spike is disturbed to a lesser extent by orifices needed for hole formation.

A hole edge reinforcing device according to the invention may advantageously be used, with the above-described advantages, to form a hole and to reinforce an edge region of the hole comprising the hole edge in a workpiece comprising a thermoplastically bound fibre tangle at least in a portion to be perforated, preferably throughout. The workpiece may be of multi-ply construction in the penetration direction, at least in the portion to be perforated, preferably completely, preferably with a plurality of plies of different fibre tangles.

The present invention is described in greater detail below with reference to the attached figures and to two exemplary embodiments of a hole edge reinforcing device and a method for reinforcing a predetermined edge region of a hole and an exemplary embodiment of a workpiece with a hole with reinforced hole edge region. In the Figures.

According to a first embodiment of the invention, the hole edge reinforcing device 2 comprises a spike 14 and a scraper part 16 constructed separately therefrom, both being made of a heat-resistant material with a melting point above the melting point of a thermoplastic polymer (binder) contained in the workpiece 10 to be perforated. Spike 14 and scraper part 16 are preferably each of one-piece construction. The hole edge reinforcing device 2 is preferably incorporated in a press mould 28, which comprises two press mould halves 30, 32 facing one another across a press gap 35. The pressing surfaces P30 and P32 of the press mould halves 30, 32 may be shaped as negatives of a desired surface of the workpiece 10 to be perforated. The pressing surfaces P30 and/or P32 may be of substantially planar construction, at least in places.

Figure 1:
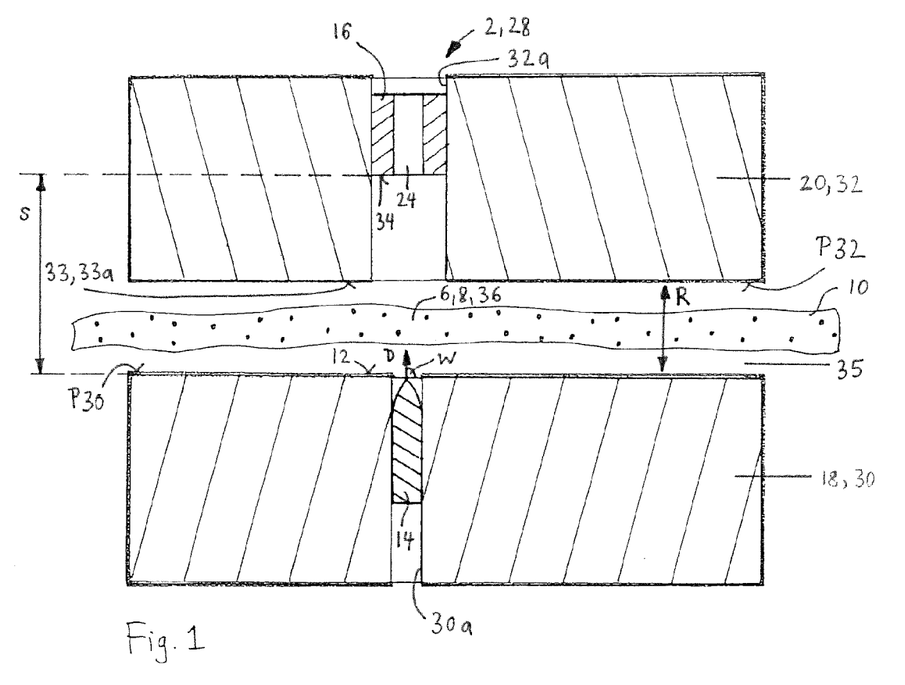
FIG. 1 is a cross-sectional view of a first embodiment of the hole edge reinforcing device according to the invention after insertion of a workpiece into the open press mould in a starting position of spike and scraper part with the scraper part in a first, displacement-controlled embodiment.

In a starting position illustrated in FIG. 1, in which the spike 14 and the scraper part 16, which is displacement-controlled according to a first embodiment, are arranged at a distance s from one another, the spike 14 is arranged preferably withdrawn behind the pressing surface P30 in a first press mould half 30 of the press mould halves 30, 32. The scraper part 16 is arranged in the starting position in a second press mould half 32. The press mould halves 30, 32 are mobile relative to one another in a direction of movement corresponding to the double-headed arrow R and enlarging or reducing the press gap 35. The scraper part 16 and the spike 14 are likewise mobile relative to one another. Preferably, both the spike 14 and the scraper part 16 are mobile relative to the first and/or second press mould half 30, 32. The spike 14 is arranged in a recess 30a in the first press mould half 30 and may be guided in this recess 30a in a penetration direction D preferably parallel to the direction of movement R from the starting position into the final position of spike 14 and scraper part 16 and from the final position back into the starting position.

Figure 2:
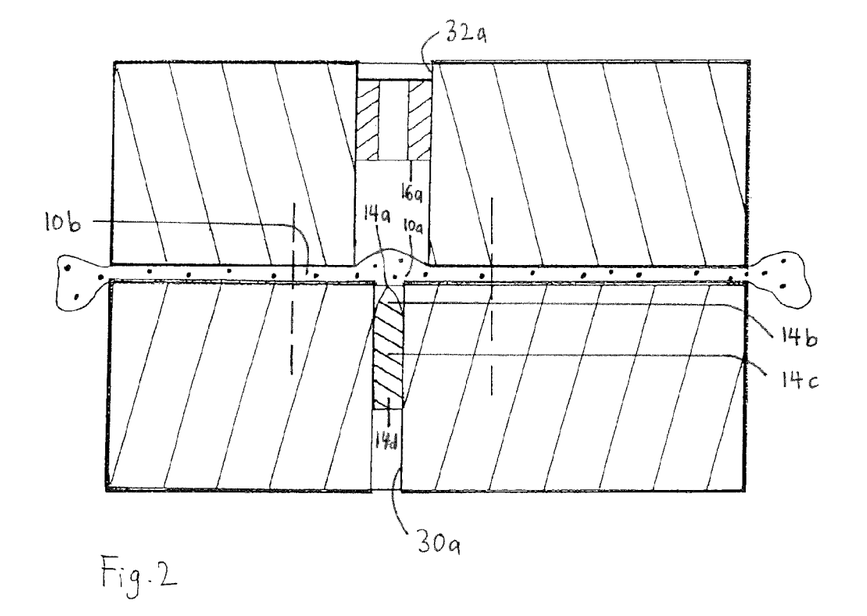
FIG. 2 is a cross-sectional view of the first embodiment of the hole edge reinforcing device according to the invention of FIG. 1 after closure of the press mould.
Figure 3:
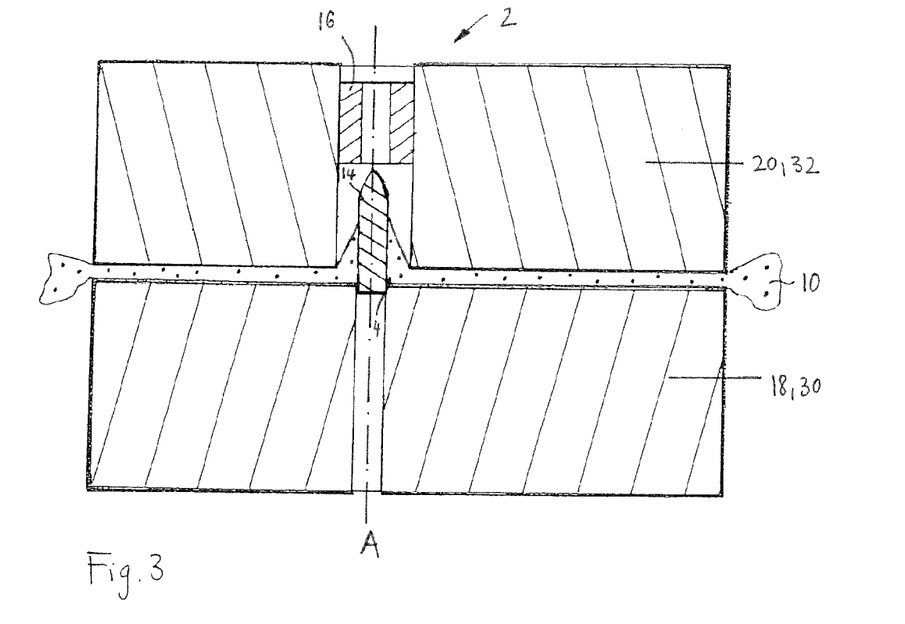
FIG. 3 is a cross-sectional view of the first embodiment of the hole edge reinforcing device according to the invention of FIG. 1 after penetration of the hole forming region of the workpiece by the spike in an intermediate position of spike and scraper part.
Figure 4:
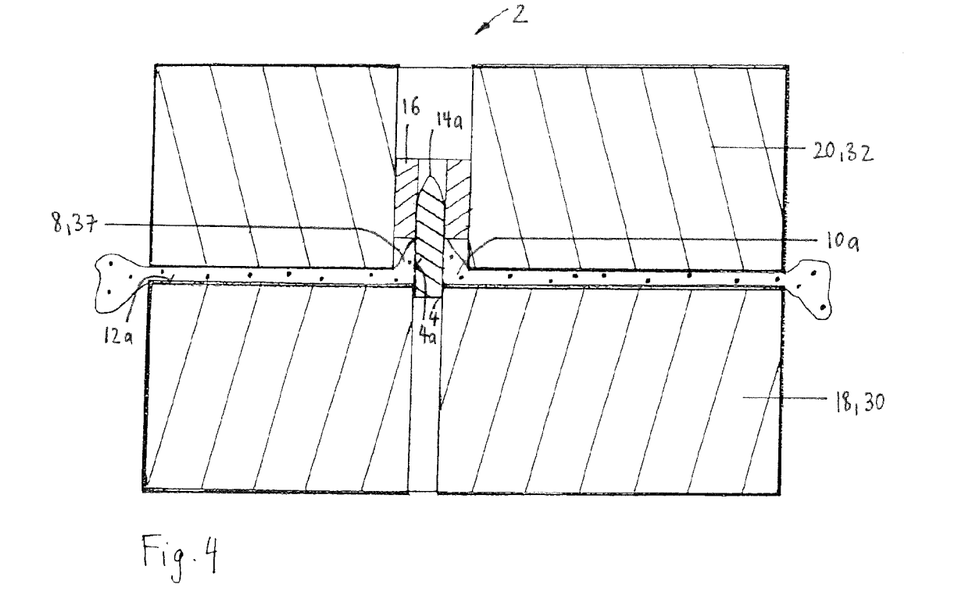
FIG. 4 is a cross-sectional view of the first embodiment of the hole edge reinforcing device according to the invention in a further intermediate position of spike and scraper part.
Figure 5:
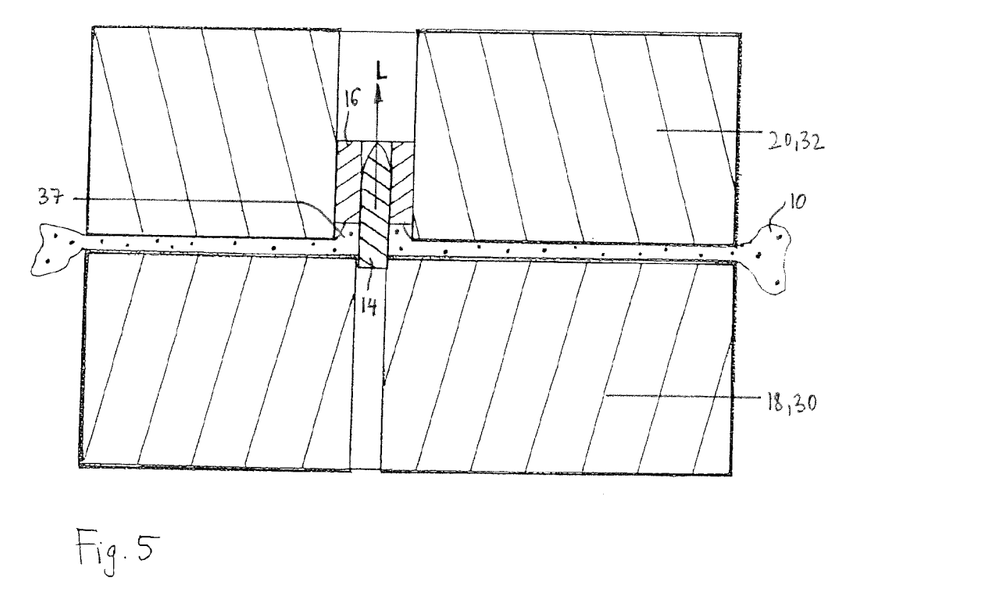
FIG. 5 is a cross-sectional view of the first embodiment of the hole edge reinforcing device according to the invention in a still further intermediate position of spike and scraper part.
Figure 6:
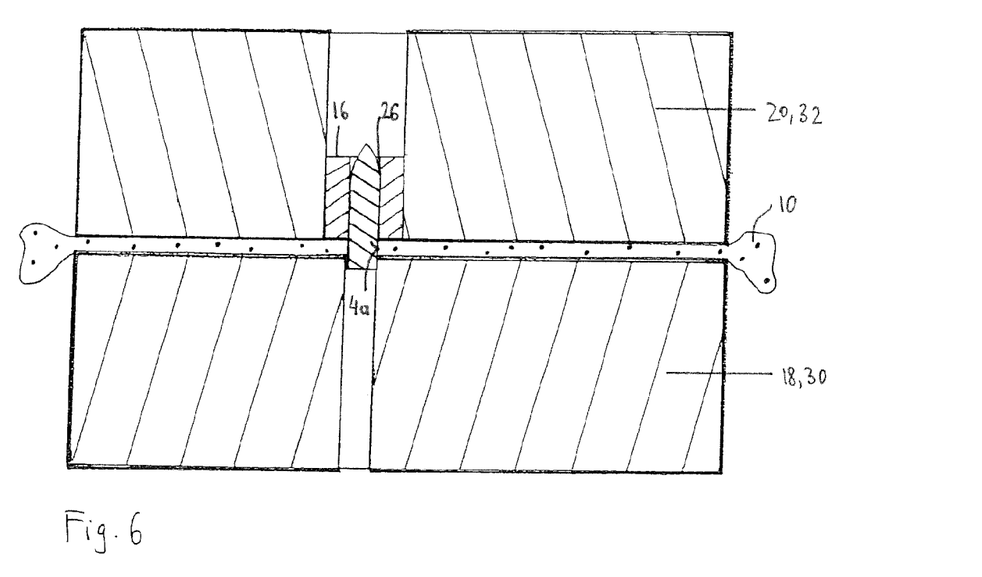
FIG. 6 is a cross-sectional view of the first embodiment of the hole edge reinforcing device according to the invention in a final position of spike and scraper part during pressing of the workpiece portion surrounding the hole (hole edge region).

FIGS. 1 and 2 in each case show the starting position of spike 14 and scraper part 16, FIGS. 3 to 5 show various intermediate positions of spike 14 and scraper part 16 and FIG. 6 shows a final position of spike 14 and scraper part 16.

In its longitudinal direction L parallel to the penetration direction D (FIG. 5), the spike 14 preferably has an elongate shape which tapers towards one longitudinal end, still more preferably a torpedo- or projectile-like shape. In general, the spike 14 comprises in its longitudinal direction L at least one longitudinal portion 14b tapering towards an end portion 14a closer to the scraper part in the starting position, preferably to a point 14a. In addition, the spike 14 may comprise a longitudinal portion 14c (body portion) adjacent the longitudinal portion 14b and located further away from the scraper part which is constructed in the longitudinal direction L with a constant, still more preferably circular, cross-sectional shape. However, the cross-section may for example have an oval shape or indeed the shape of a triangle, quadrilateral or polygon or have any other desired shape. With a spike of a corresponding shape an elongate hole may also be produced.

The scraper part 16 is arranged in a recess 32a in the second press mould half 32 and may be guidable in this recess 32a in the penetration direction D from the starting position shown in FIGS. 1 and 2 into the final position shown in FIG. 6 of the scraper part 16 and back therefrom into the starting position. It preferably exhibits an elongate, substantially cylindrical shape with a circular cross-section constant in the penetration direction D. An internal recess 24, preferably in the form of a through-hole 24, is provided in the scraper part 16. The scraper part 16 may however also be resilient and without permanent internal recess 24, the internal recess 24 then being formed temporarily by resilient deformation caused by penetration of the spike 14 into the scraper part 16. In the case of a permanent internal recess 24, the scraper part 16 preferably takes the form of a sleeve or hollow cylinder. The ratio of the cross-sectional dimensions of internal recess 24 and spike 14 is preferably selected such that in the final position a radial gap 26 formed between the internal recess 24 and the spike 14 is provided, which is dimensioned such that the spike may be introduced into the internal recess with the least possible play. At its longitudinal end 16a closer to the spike the scraper part 16 comprises a surface portion 34 which may serve as a pressing surface 34 during or after formation of a hole 4 in the workpiece 10, as described in greater detail below.

According to the first embodiment of the hole reinforcing device according to the invention, a sensor (not shown) may be provided for detection of a distance between the scraper part 16 and its starting position illustrated in FIG. 1. The scraper part 16 may be moved as a function of its distance from its starting position in the recess 32a relative to the workpiece 10 and the spike 14 in such a way that moving the scraper part 16 further away from the starting position beyond the maximum distance is not feasible.

As shown in FIGS. 1 and 2, in the starting position of spike 14 and scraper part 16 the end portion 14a of the spike 14 lies substantially in an area defined by the workpiece bearing area 12 or is at least adjacent thereto, such that the spike 14 is preferably fully accommodated in the first press mould half 30 in the starting position and does not project into the space spanned by the press gap 35 between the press mould halves 30, 32. It is also feasible, however, for the spike 14 to project into this space even in the starting position. Preferably the scraper part 16 is fully accommodated in the second press mould half 32 at any time, i.e. never projects beyond the second press mould half 32 towards the first press mould half 30. The workpiece bearing surface 12, which in the example illustrated coincides with the pressing surface P30, forms an angle w other than zero with the penetration direction D, said angle preferably amounting to 90 degrees.

In the intermediate positions (FIGS. 3 to 5) and the final position (FIG. 6) the spike 14 passes with its end portion 14a, preferably its point 14a, with the tapering longitudinal portion 14b and preferably with the longitudinal portion 14c further away from the scraper part (body portion) through a portion 6 of the workpiece 10 to be perforated, displacing fibres 8 of the workpiece 10 as it goes. In this position, the scraper part 16 surrounds at least one but preferably all of these longitudinal portions 14a, 14b, 14c at least partially, leaving the radial gap 26, as shown in FIG. 6.

The spike 14 and the scraper part 16 are arranged in the starting position preferably completely on different sides of the workpiece bearing area 12. The spike 14 is then located on the spike side 18 and the scraper part 16 on the scraper side 20. In the intermediate positions and in the end position the spike 14 is located, preferably only in parts, on the scraper side 20 of the workpiece bearing surface 12, such that a longitudinal end 14d of the spike 14 further from the scraper always remains on the spike side 18 in the recess 30a in the first press mould half 30. In the final position the pressing area 34 of the scraper part 16 preferably terminates flush with a surface portion 33a, facing the first press-mould half 30, of a region 33 adjacent the pressing surface 34 of the second press mould half 32, as shown in FIG. 6. The longitudinal axes of the spike 14 and of the scraper part 16 in the penetration direction D are preferably always arranged along a common axis A (see FIG. 3), along which the spike 14 and the scraper part 16 are mobile relative to one another.

In the embodiment looked at here merely by way of example, the workpiece 10 comprises a needled tangled glass fibre fabric 36 possibly non-uniformly infiltrated by a thermoplastic polymer. The workpiece 10 may be constructed with a plurality of plies in the penetration direction D, preferably different fibre tangles 36.

In the workpiece a hole 4 is formed by means of the method according to the invention and/or with the assistance of the hole edge reinforcing device 2 according to the invention, which hole is surrounded by an edge region 10a of predetermined shape and predetermined degree of hardening encompassing the hole edge 4a (see FIG. 6) of the hole 4, shape and degree of hardening being determined by the method according to the invention, in particular by the scraper part used. The size of the edge region 10a in the main plane of extension of the workpiece 10 corresponds substantially to the size of the pressing surface 34 of the scraper part 16 producing the edge region 10a. In addition, around the hole 4 a material region 10b located outside the edge region 10a is additionally formed (see dashed line in FIG. 2), which in the workpiece according to the invention exhibits a lower average degree of compaction than the edge region 10a. Hole 4, edge region 10a and material region 10b form a hole region 6. The edge region 10a is on the one side immediately and non-overlappingly defined by the hole 4 and on the other side immediately and non-overlappingly defined by the material region 10b.

The hole edge reinforcing method will be described below by way of example with reference to one embodiment. By heating the workpiece 10, for example in a circulating air oven, to a temperature above the melting temperature of the thermoplastic material and below the melting temperature of the reinforcing glass fibres, the workpiece 10 is transformed into a partially molten state, in which it is fed into the press gap 35 between the two press mould halves 30, 32 onto the workpiece bearing surface 12. Alternatively, the partially molten state of the workpiece 10 may also be produced only in the hole edge reinforcing device 2 by suitable heating means provided therein. The workpiece 10 is preferably placed on the workpiece bearing surface 12 in such a way that the portion 6 to be perforated is preferably passed through centrally by the common axis A of spike 14 and scraper part 16.

FIG. 1 shows the open press mould with the workpiece 10 to be placed on the workpiece bearing surface 12 and comprising glass fibres 8 at least in the portion 6 to be perforated, which workpiece includes molten thermoplastic constituents. FIG. 2 shows the workpiece after the press mould halves 30, 32 have been brought together, prior to press-forming of the entire workpiece. In this case, according to the embodiment described herein the spike 14 and the scraper part 16 are still in their starting positions within the respective press mould halves 30, 32. In the portion 6 to be perforated, the workpiece 10 has not at this point as yet been exposed to pressure, since the region of the second press mould half 32 opposite the portion 6 to be perforated forms an end portion of the recess 32a.

In a method step illustrated in FIG. 3, the spike 14 is then guided along the common axis A in the penetration direction D towards the scraper part 16 through the portion 6 of the workpiece 2 to be perforated. In so doing, the spike 14 impinges with its end portion 14a closer to the scraper part, here formed as a point 14a, in the portion 6 to be perforated on fibres 8, for example in the form of a fibre tangle 36, the end portion 14a then displacing the fibres 8 radially outwards relative to the longitudinal centre axis of the spike 14 coinciding with the axis A, such that the fibres 8 are not severed.

According to another embodiment of the invention, the spike 14 may however comprise severing means (not shown) at its end portion 14a, in particular cutting means, for severing fibres 8 in the portion to be perforated, if the material used requires this.

Some of the displaced fibres 8 are carried along by the spike 14 advancing in the penetration direction D, such that fibres 8 may be deposited on one or more of the end portion 14a, the tapering longitudinal portion 14b and the longitudinal portion 14c further from the scraper part (body portion) of the spike 14. The spike 14 is however preferably displaced to such an extent, assuming the intermediate position shown in FIG. 3, that the fibres 8 only remain lying against the longitudinal portion 14c of constant cross-section further from the scraper part (body portion).

Only then does scraping of the fibres 8 from the spike 14 start. To this end, the scraper part 16, as shown in FIG. 4, is displaced towards the spike 14, until the end portion 14a, the tapering longitudinal portion 14b and, at least partially, the longitudinal portion 14c further from the scraper part are introduced into the scraper part 16, in each case leaving at least the radial gap 26. In the process, the scraper part 16 scrapes off, in particular with its area on the spike side and comprising the pressing area 34, the fibres 8 lying against the longitudinal portion 14c further from the scraper part contrary to the penetration direction D towards the region 6 of the workpiece 10 to be perforated and pushes these fibres in front of it towards region 6, whereby a fibre dam 37 forms. As shown in FIG. 5, the scraper part 16, displacement-controlled according to the first embodiment, is moved substantially far enough contrary to the penetration direction D towards the portion 6 of the workpiece 10 to be perforated for the fibre dam 37 to be introduced, when spike 14 and scraper part 16 are in the final position, into the edge region 10a of the hole in the desired thickness or compaction in such a way that the thermoplastically bound fibre material of the finished workpiece 10 exhibits a higher degree of compaction in the edge region 10a than in the regions of the hole region 6 located radially outside the predetermined edge region 10a.

In the example illustrated, the edge region 10a is constructed with a higher material density than the material region 10b of the workpiece 10 and with preferably substantially the same thickness in the penetration direction D. In a further compaction step illustrated in FIG. 6, the fibre dam 37 introduced into the edge region 10a is exposed to pressure by the pressing area 34 of the scraper part 16, such that the material of the fibre dam 37 is pressed and compacted with the remaining material of the edge region 10a, whereby the hole edge 4a of the hole 4 formed is reinforced to make it resistant to tearing out.

This compaction step may moreover also take place without press-forming of other workpiece portions performed at the same time or subsequently by the press mould halves 30, 32.

The movement paths by which the spike 14 and the scraper part 16 are displaced, and the pressing pressures exerted by the press mould halves 30, 32 and the pressing surface 34 are adjustable at the hole edge reinforcing device 2 preferably as a function of the composition and desired thickness of the material and the desired compaction or tear-out strength of the edge region 10a of the hole. In addition, the spike 14 and the scraper part 16 may be displaced, for example hydraulically or pneumatically. Corresponding drives associated with the spike 14 and the scraper part 16 are not shown in the Figures. Furthermore, the spike 14 and the scraper part 16, when the partly molten workpiece 10 is placed in the press mould, are preferably at ambient temperature, thus are preferably not heated for the hole edge reinforcing process by a heating device provided specifically therefor, such that, even with iterative implementation of the hole edge reinforcing method, the spike 14 and the scraper part 16 are at a temperature below the melting point of the thermoplastic contained in the material. However, in a further development of the invention, heating of the spike 14 and/or of the scraper part 16 by at least one heating device provided specially therefor is also feasible, such that, with suitable adjustment in particular of the temperature of the spike 14, melting of the thermoplastic material may be brought about or assisted by penetration of the workpiece 10 by the spike 14.

Preferably, in the method according to the invention the scraper part 16 may additionally be selected in terms of the size of its pressing surface 34 as a function of the fibre composite of the hole region 6, the size of the hole 4 to be formed and the desired reinforcement of the edge region 10a of the hole 4 to be formed.

Figure 7:
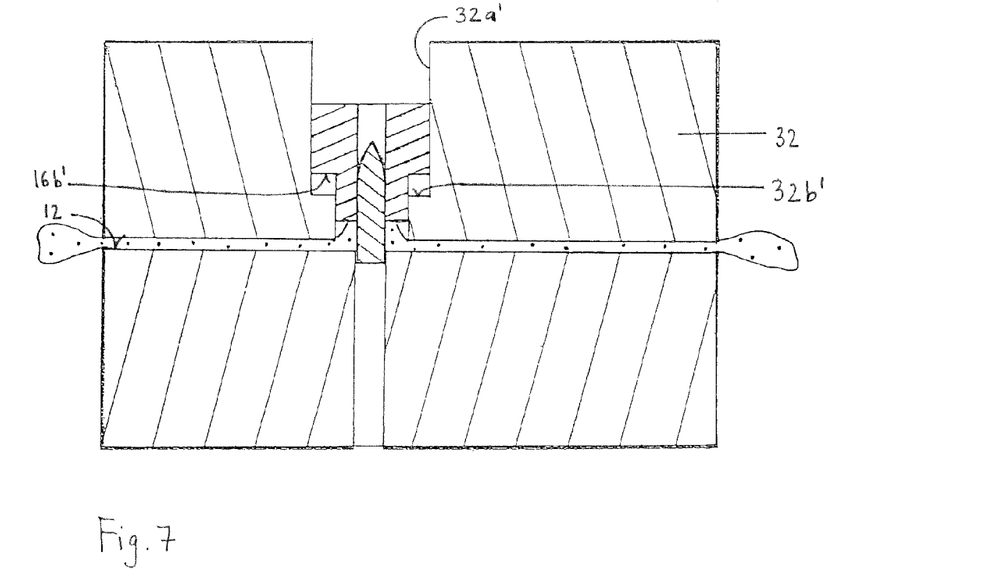
FIG. 7 is a cross-sectional view of a second embodiment of the hole edge reinforcing device according to the invention in an intermediate position of spike and scraper part in a second embodiment of the scraper part.

FIG. 7 is a cross-sectional view of a second embodiment of the hole edge reinforcing device according to the invention in an intermediate position of spike 14 and scraper part 16' in a second embodiment. The second embodiment of the hole reinforcing device according to the invention differs from the first embodiment in the scraper part 16' and the configuration of the recess 32a' in the second press mould half 32 accommodating the scraper part 16'. The second embodiment otherwise corresponds to the first embodiment and is hereinafter described only with regard to its differences from the first embodiment.

The scraper part 16' in the second embodiment is not displacement-controlled. Its maximum distance from its starting position shown in FIG. 1 is instead determined by a stop projection 32c' provided with a bearing surface 32b' remote from the surface portion 33a, which projection is formed on the second press mould half 32' adjacent the recess 32a'. The scraper part 16' is provided with a counter bearing surface 16b' facing the workpiece bearing surface 12. The shape of the bearing surface 32b' corresponds substantially to that of the counter bearing surface 16b'. Both the bearing surface 32b' and the counter bearing surface 16b' are preferably of annular construction. Both surfaces may however also have other shapes. In the compaction step according to the second embodiment of the hole edge compaction method, the scraper part 16b' is moved far enough towards the edge region 10a for the counter bearing surface 16b' of the scraper part 16' to come to rest against the bearing surface 32b' of the second press mould half.

Figure 8:
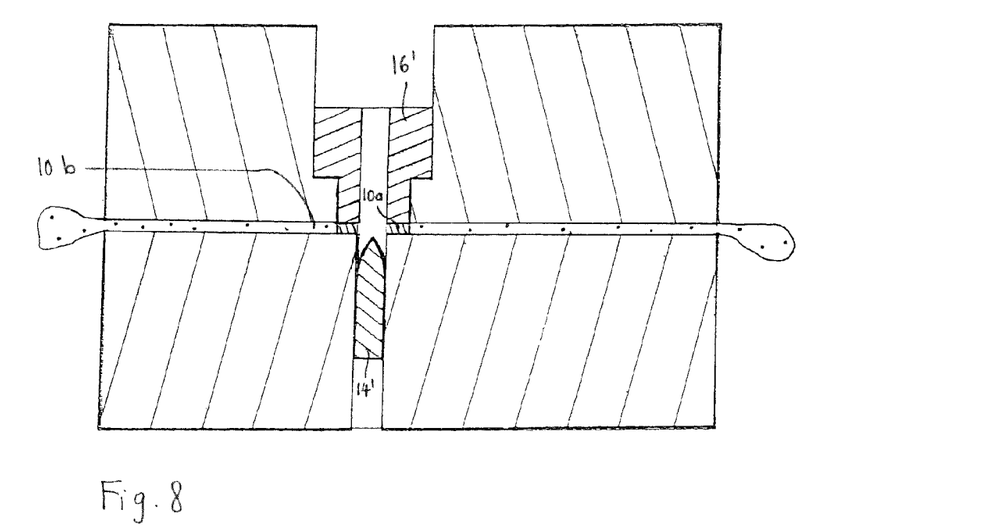
FIG. 8 is a cross-sectional view of the second embodiment of the hole edge reinforcing device according to the invention in a final position of spike and scraper part after pressing of the workpiece portion surrounding the hole (hole edge region).

FIG. 8 shows the second embodiment of the hole edge reinforcing device according to the invention with a further final position of spike and scraper part after compaction of the hole edge region 10a.

It has been found that edge region 10a and material region 10b of a workpiece according to the invention have substantially the same fibre length distribution if no severing means are used to sever the fibres during production of the workpiece.

In tests with a particular SeeberLite® material, it proved possible to produce a workpiece 10 using a scraper part provided with an external diameter of 18.2 mm with a hole 4 with a hole diameter of 8.0 mm and compacted hole edge, wherein it proved possible to increase the degree of compaction of the material in the region of the hole edge from 78% to 95% and the material density from 0.9 g/cm$^3$ to 1.12 g/cm$^3$. The tear-out strength was here increased by 218%.

The invention claimed is:

1. A method of reinforcing a hole edge region surrounding a hole of a workpiece comprising thermoplastically bound fiber composite material, the method comprising steps of:
    providing the workpiece in a condition in which thermoplastic binder thereof is softened in at least a hole region of the workpiece intended for perforation;
    during press-forming of the workpiece between first and second mold halves:
    penetrating the workpiece at the hole region by moving a pointed spike positioned within the first mold half with respect to the first mold half and toward the composite material and second mold half so as to form the hole;
    scraping displaced composite material fibers from the spike by moving a scraper part positioned within the second mold half with respect to the second mold half and toward the hole edge region, first mold half, and spike; and
    compacting the hole edge region in an area surrounding the spike with a pressing surface of the scraper part so as to form a higher degree of compaction of the hole edge region with respect to surrounding regions located radially outside of the hole edge region, the hole edge region thereby exhibiting a degree of compaction of less than 90%.

2. The method of claim 1, wherein the spike comprises a body portion having a constant cross-sectional area and a longitudinal end portion tapering from the body portion to form the spike point.

3. The method according to claim 2, wherein said scraping begins at earliest when the spike has penetrated the hole region to such an extent that fibers of the workpiece lie substantially only against the spike body portion and not against the spike end portion.

4. The method according to claim 1, wherein said scraper movement is contrary to a penetration direction of the spike.

5. The method according to claim 4, wherein said scraper movement begins after said spike movement for penetration has terminated.

6. The method according to claim 1, further comprising selecting the scraper part in terms of a size of the pressing surface thereof as a function of fiber composite material of the hole region, a desired size of the hole to be formed, and a desired reinforcement of the hole edge region.

7. The method according to claim 1, wherein a force exerted on the scraper part during said compacting is greater than a force exerted on the spike during said penetrating.

8. The method according to claim 1, wherein said penetrating results in severing of fibers of the hole region.

9. The method according to claim 1, wherein the degree of compaction is less than 80%.

10. The method according to claim 1, wherein the composite material comprises a thermoplastically bound fiber tangle.

\* \* \* \* \*